United States Patent Office 2,788,295
Patented Apr. 9, 1957

2,788,295
TITANIA MONOHYDRATE SOIL RETARDING TREATMENT OF TEXTILES

Theodore F. Cooke, Martinsville, and Elliot S. Pierce, Plainfield, N. J., assignors to American Cyanamid Company, New York, N. Y., a corporation of Maine No Drawing. Application November 12, 1953, Serial No. 391,736

9 Claims. (Cl. 117—169)

This invention relates to a process for treating textile fibers in order to impart soil resistant properties thereto. Still further, this invention relates to the treatment of textile fibers, fabrics, pile fabrics, and the like in order to impart soil resistant properties thereto. Still further, this invention relates to a process for treating textile fibers comprising impregnating said fibers with certain aqueous dispersions of hydrous titania under acidic conditions. Still further, this invention relates to the products produced according to the processes of the present invention.

One of the objects of the present invention is to impart soil resistant properties to textile fibers and, more particularly, to textile fabrics. A further object of the present invention is to impart soil resistant properties to textile fabrics containing fibers by treating said fibers with an aqueous dispersion of titania monohydrate under acidic conditions such as at a pH below about 5. These and other objects of the present invention will be discussed more fully hereinbelow.

One of the critical features of the present invention resides in the particle size of the hydrated titania in the aqueous dispersion which is used for treating the textile fibers. The particle size of the titania monohydrate should be less than about 0.1 micron and preferably, for commercial operations, between about 0.02 and 0.075 micron. The amount of solids of the titania which may be utilized will cover a rather wide range such as between about 0.1 and 5% by weight based on the total weight of the aqueous dispersion. It is preferred, however, that the concentration of solids in the sol or dispersion be between about 0.5 and 1.5% by weight. For optimum operability and results, the concentration is generally held at about 1% solids by weight. The amounts of titania monohydrate are set forth in terms of anhydrous titanium dioxide throughout the present specification and claims.

In order that the present invention may be more completely understood, the following examples are set forth in which all parts are parts by weight, unless otherwise indicated. It should be remembered that these examples are set forth primarily for the purpose of illustration and any specific enumeration of detail contained therein should not be interpreted as a limitation on the case unless indicated in the appended claims.

METHOD FOR THE PREPARATION OF THE COLLOIDAL TITANIA MONOHYDRATE

The third Moore filter cake obtained in the manufacture of $TiO_2$ from the ore is slurried in water, neutralized with dilute ammonium hydroxide to a pH of 7.0–7.2, filtered, washed cold to remove sulfate ions and filtered again. The filter cake is then triturated with concentrated hydrochloric acid until a bluish white glass-like syrup is obtained. This syrup is then diluted with a large volume of water which is slightly acidified with hydrochloric acid. An aqueous dispersion of hydrated titania having a uniform particle size, averaging about 0.024 micron and a pH of 3.5 is obtained which is substantially free of flocs.

Example 1

A colloidal suspension of titania monohydrate prepared as described above and containing 1% solids expressed as anhydrous titanium dioxide by weight based on the total weight of the suspension is applied to a white 5″ x 5″ carpet sample having an all wool pile by immersing the pile into the solution. The wet pick-up is 200% by weight based on the weight of the entire fabric. The carpet is then dried in a stream of air at 90° C. for 10 minutes. There is no indication of any wet precipitate as a result of this treatment. The treated piece and an untreated control are fastened to two 5″ x 5″ windows in a revolving drum for the purpose of exposing the treated and control pieces to soil. Two grams of a synthetic soil is entered into the drum, the opening is closed and the drum is rotated for 20 minutes. The samples are then removed, vacuum cleaned and the treated sample is compared with the control in order to evaluate the effectiveness of the treatment for imparting soil resistance. The treated carpet is light gray in color while the untreated carpet is practically black.

Example 2

A titania monohydrate colloidal suspension containing 1% solids by weight as titanium dioxide based on the total weight of the solution is applied to a white 5″ x 5″ woolen carpet with a 50% wet pick-up based on the whole pile (100% by weight on the pile showing) by immersion of the upper ⅛ inch of the pile only. After drying in the stream of air for 10 minutes at 95° C., the carpet was tested for soil resistance, together with an untreated control as in Example 1. The treated carpet sample was greatly superior to the control. Yet no whitening due to the treatment was detectable.

Example 3

A 1% colloidal suspension of titania monohydrate prepared as set forth hereinabove is applied to a plurality of 5″ x 5″ pieces of carpets having the following piles:

A. Wool-viscose
    B. All viscose
    C. All cotton

The amount of dispersion applied to the piles was sufficient to give deposits of 2% $TiO_2$ by weight based on the weight of the pile showing in each instance. The wet pile is dried in warm to hot air streams. Soil resistance tests comparable to that set forth in Example 1 are carried out and, in each instance, these piles had excellent soil resistance when compared to the respective untreated controls. Furthermore, there was no detectable whitening on any of the treated pieces.

Example 4

A colloidal titania monohydrate suspension containing 1% solids by weight as titanium dioxide is applied to the following flat fabrics: (1) all wool, (2) acetate and nylon mixed. The amount of the titania applied was sufficient to give a 1% deposit on the fibers after hot air drying. Soil resistance was tested by drawing air in equal amounts simultaneously through 3-inch circles of the taut treated fabric and simultaneously through taut untreated controls. After vacuum cleaning, the residual soil in the treated piece was very much less than the residual soil in the controls indicating the effectiveness of the treatment.

Example 5

The procedure of Example 3 is repeated except that the colloidal dispersion is increased to 4% titanium dioxide content and the pick-up of the pile is 100%, thus depositing about 4% by weight of the hydrous titania sol (computed as $TiO_2$) on the pile. The whitening of a black dyed fabric is only slightly perceptible.

Example 6

The procedure of Example 3 is repeated except that the concentration of the suspension is reduced to about 0.5% by weight so that when the pile pick-up is 100% of the suspension, the solids deposited thereon is 0.5% computed as $TiO_2$. The soil resistance tests of this material showed a very marked improvement over the result obtained from a piece that had been treated with water only.

The process of the present invention may be applied to fibers such as wool, silk, cotton, linen, and synthetic fibers such as those derived from linear super polyamides, linear polyesters, polyacrylonitrile and the like and fabrics containing these fibers and mixtures thereof.

In addition to imparting soil resistance to the treated fibers, the process of the present invention also imparts slip resistance to the fibers and also produces fibers which are free of the defect of whitening, particularly when the treatment is applied to black dyed fabrics or those dyed with dark shades. By practicing the process of the present invention, the positively charged hydrous titanium dioxide suspension is applied to fibers, wherein the suspension is composed of particles which are so small that the dispersion is practically colorless. This is advantageous inasmuch as the hydrated titania particles impart this soil resistant characteristic to the fibers without producing any whitening of the fabric. A further advantage of the present invention resides in the fact that these positively charged suspensions are stable even in concentrated form and can be stored for long periods of time at room temperature without aggregation or separation thus making it possible to prepare these suspensions in advance of their use. A still further advantage of the present invention resides in the fact that these sols can be diluted easily without separation or precipitation. A still further advantage of the present invention resides in the fact that the titanium dioxide hydrate sol contains particles of such minute size that maximum soil resistance can be obtained with a minimum of solids take-up. This means that the process can be carried out at a minimum of additional cost and yet produce these very desirable results. As an additional advantage of the present invention, good slippage control is obtained without appreciably increasing the weight and stiffness of the fabrics so treated. A further advantage of the present invention resides in the fact that the treating composition can be applied to the fabrics from a single bath.

The acids which may be used to control the pH of the treating dispersion are the monovalent inorganic acids such as nitric acid, hydrochloric acid, hydrobromic acid, hydroiodic acid, hydrofluoric acid, nitrous acid and the like.

The treating suspension may be applied to the fibrous materials by any one of a plurality of conventional treating methods such as by immersion, spraying, or passing the fabric in contact with a quetch-roll, which travels in the treating dispersion and carries a film of the treating suspension up to and onto the fabric. So called flat fabrics or woven carpets (which do not contain a pile) may be immersed in the dispersion and then passed through a wringer to give about 100% wet pick-up by weight based on the weight of the fabric. Pile fabrics on the other hand may be passed over a roll with the pile down in such a manner that the pile is just close enough to the surface of the suspension so that the pile is wetted without contacting the adhesive binding on the back of the fabric. Such a bath may be maintained at the desired height by utilizing an overflow pipe. Regardless of the manner in which the dispersion is applied to the fabric, the treated fabric is always dried by some conventional means such as by passing the treated fabric over stenters or through hot flues or in loop driers. Pile fabrics should be dried on conventional equipment designed for this purpose in order that the pile remains upright and is not damaged by the aqueous treatment. It is not known exactly how the colloidal hydrous titania operates to reduce the soiling. Microscopic examination of the fiber fails to indicate the presence of a continuous film on the fiber of the treated material.

An analysis of the third Moore cake shows 10 mols of $TiO_2$, 10 mols of $H_2O$, and 1 mol of $SO_3$. The $SO_3$ is present as an impurity from the earlier treatment of the ore with sulfuric acid. The neutralization of this $SO_3$ group with ammonia removes this group and leaves $TiO_2 \cdot H_2O$. Trituration with the hydrochloric acid appears to convert the $TiO_2 \cdot H_2O$ to $[TiO_2 \cdot H]^+ Cl^- \cdot H_2O$. In the preferred process for preparing the aqueous dispersion of the titania monohydrate, one mol of hydrochloric acid is used for each 10 mols of $TiO_2 \cdot H_2O$ of the final product, probably forming $[9TiO_2 \cdot TiO_2 \cdot H \cdot 10H_2O]^+ Cl^-$.

Example 7

A 1% colloidal suspension of titania monohydrate, expressed as $TiO_2$, is padded on the black cotton fabric with a 100% wet pick-up. The fabric is then dried for 5 minutes in a stream of air at 90° C. A second piece of the same fabric similarly treated with water alone was barely distinguishable from the titania treated piece indicating that no white deposit resulted from the treatment with the titania hydrate.

The pH of the aqueous dispersion of hydrous titania used in the practice of the process of the present invention should be controlled below about 5, such as at any pH between about 1 and 5. Wherever the fiber is of such a nature that it will be deleteriously affected by very low pH's such as 1 or 2, the pH should be controlled above 3 or even 4.

The drying of the impregnated fibers or fabrics can be done at temperatures between about 80 and 115° C. Lower temperatures could be used but they would necessitate lengthening the treating time and, as a consequence, should be avoided. Higher temperatures may be used but because of the tendency toward yellowing, these should be avoided, particularly on white or light colored fabrics. The drying time is generally about 5 to 20 minutes.

We claim:

1. A process for imparting soil-retardant properties to textile fibers which comprises treating the fibers with an aqueous colloidal dispersion substantially free of sulfate ions and having a pH less than about 5 of dispersed titania monohydrate particles with substantially no particles exceeding about 0.1 micron in size and a monobasic inorganic acid and thereafter drying the fibers.

2. A process according to claim 1 in which a textile fabric is treated.

3. A process according to claim 1 in which the average particle size of said titania monohydrate is between about 0.02 and about 0.075 micron.

4. A process according to claim 1 in which a textile fabric is impregnated with a dispersion of said titania monohydrate of an average particle size between about 0.02 and about 0.075 micron.

5. A process according to claim 1 in which a pile fabric is impregnated with said dispersion.

6. A process according to claim 1 in which a pile fabric is impregnated with a dispersion containing between about 0.1 and 5 percent by weight of titania monohydrate of an average particle size between about 0.02 and about 0.075 micron.

7. Soil resistant textile fibers bearing titania monohydrate deposited according to the process of claim 1.

8. A soil resistant textile fabric bearing between about 0.1 and 5 percent of titania monohydrate based on the weight of said fabric and deposited according to the process of claim 1.

9. A soil resistant pile fabric bearing titania monohydrate deposited according to the process of claim 1 from a dispersion containing titania monohydrate particles with an average size between about 0.02 and about 0.075 micron.

References Cited in the file of this patent

UNITED STATES PATENTS

| | | |
|---|---|---|
| 1,692,372 | Gardner | Nov. 20, 1928 |
| 1,983,349 | Dreyfus | Dec. 4, 1934 |
| 1,999,182 | Dreyfus et al. | Apr. 30, 1935 |
| 2,534,318 | Swanson | Dec. 19, 1950 |
| 2,570,750 | Bauer | Oct. 9, 1951 |
| 2,622,307 | Cogovan et al. | Dec. 23, 1952 |